United States Patent
Wu

(10) Patent No.: US 8,880,063 B2
(45) Date of Patent: Nov. 4, 2014

(54) METHOD AND USER EQUIPMENT WITH DUAL RF TRANSCEIVERS TO PERFORM PLMN LIST GENERATION OR PLMN SEARCH

(75) Inventor: Jing-Yi Wu, Ilan Hsien (TW)

(73) Assignee: Mediatek Inc., Hsin-Chu (TW)

( * ) Notice: Subject to any disclaimer, the term of this patent is extended or adjusted under 35 U.S.C. 154(b) by 1161 days.

(21) Appl. No.: 12/390,558

(22) Filed: Feb. 23, 2009

(65) Prior Publication Data

US 2010/0216460 A1    Aug. 26, 2010

(51) Int. Cl.
H04W 4/00 (2009.01)
H04W 48/16 (2009.01)
H04W 88/06 (2009.01)

(52) U.S. Cl.
CPC ............. *H04W 48/16* (2013.01); *H04W 88/06* (2013.01)
USPC ...... 455/434; 370/335; 455/552.1; 455/435.1

(58) Field of Classification Search
USPC ........................................................ 455/434
See application file for complete search history.

(56) References Cited

U.S. PATENT DOCUMENTS

| 2002/0197992 A1* | 12/2002 | Nizri et al. | 455/435 |
| 2005/0164737 A1 | 7/2005 | Brown | |
| 2007/0082698 A1* | 4/2007 | Su | 455/552.1 |
| 2007/0211669 A1* | 9/2007 | Umatt et al. | 370/335 |
| 2009/0258645 A1* | 10/2009 | Ramkull et al. | 455/434 |

* cited by examiner

*Primary Examiner* — Gerald Johnson
(74) *Attorney, Agent, or Firm* — McClure, Qualey & Rodack, LLP

(57) ABSTRACT

Techniques for efficiently performing public land mobile network (PLMN) list generation or PLMN search on user equipment for use in a mobile communication system are described. The user equipment is operating in a plurality of supported modes and each supported mode includes a plurality of frequency bands. The user equipment includes an antenna, two RF transceivers and a processor. The RF transceivers are coupled to the antenna for operating in the operating frequency bands via the antenna. The processor coupled to the RF transceivers receives a request requesting PLMN list generation or PLMN search, determines whether both or either of the RF transceivers are available for handling the PLMN list generation or PLMN search, respectively directs the RF transceivers to generate a PLMN list or perform a search for at least one selected operating frequency band according to the request and a dispatch rule, and provides a corresponding execution result.

24 Claims, 3 Drawing Sheets

METHOD AND USER EQUIPMENT WITH DUAL RF TRANSCEIVERS TO PERFORM PLMN LIST GENERATION OR PLMN SEARCH

BACKGROUND OF THE INVENTION

1. Field of the Invention

The invention relates to the field of wireless communication, and more particularly to techniques for performing cooperative PLMN list generation or PLMN search on user equipment (UE) with dual RF transceivers in a mobile communication system.

2. Description of the Related Art

User equipment (UE) may be capable of communicating with different wireless networks by selecting different cells from a list of acceptable cells of several public land mobile networks (PLMNs). The user equipment generates a PLMN list by scanning all operating frequency bands to search for wireless networks of all supported radio access technologies (RATs), such as universal mobile telecommunications system (UMTS) networks, and global system for mobile communication (GSM) networks. For example, when the user equipment is turned on, the user equipment may perform a manual search or an automatic search to generate a PLMN list including a home PLMN (HPLMN) and other PLMNs. The PLMN list may be provided for normal cell selection or recovery communication from a limit service area or no service area. Further, when camping on a specific PLMN, the user equipment is required to periodically perform a home PLMN (HPLMN) search or a higher priority PLMN search to look for a more suitable PLMN with higher priority or better signal quality than the specific PLMN. However, the process of searching all supported RATs is substantially time period-consuming, especially when the user equipment moves among cells.

Moreover, since the user equipment according to the prior art is supplied with one single RF transceiver, the process of PLMN list generation or PLMN search may be suspended or not allowed when the user equipment enters into a dedicated mode, such as establishing a dial-up connection, transferring data packets, answering an incoming voice call, or performing a WAP/Internet browsing application. In such situations, the PLMN list generation or PLMN search operation would be suspended, and the intermediate list or search results would be discarded. Inevitably, the user equipment would have to restart the PLMN list generation or PLMN search, thereby deteriorating the general performance of the user equipment and leading to bad user experience.

Therefore, a need exists for user equipment capable of performing PLMN list generation or PLMN search more reliably and efficiently so as to improve the general performance of the user equipment.

BRIEF SUMMARY OF THE INVENTION

The invention provides a method for performing a public land mobile network (PLMN) list generation or PLMN search on user equipment having two radio frequency (RF) transceivers, wherein the user equipment is operating in a mobile communication system. The method includes: the step of receiving a request requesting the PLMN list generation or PLMN search; determining whether both or either of the RF transceivers is available for handling the PLMN list generation or PLMN search; selecting a dispatch rule; generating a PLMN list from each RF transceiver or performing a search for at least one selected operating frequency band on each RF transceiver in accordance with the request and the dispatch rule; and providing an execution result corresponding to the PLMN list generation or PLMN search by gathering the PLMN lists or the searches obtained from the RF transceivers.

The invention also provides a user equipment device including an antenna, two RF transceivers and a processor. The user equipment is operating in a plurality of supported modes and each supported mode includes a plurality of operating frequency bands. The RF transceivers are coupled to the antenna for operating in the operating frequency bands via the antenna. The processor is coupled to the RF transceivers for receiving a request requesting PLMN list generation or PLMN search, determining whether both or either of the RF transceivers are available for handling the PLMN list generation or PLMN search, respectively directing the RF transceivers to generate a PLMN list or perform a search for at least one selected operating frequency band in accordance with the request and a dispatch rule, and providing an execution result corresponding to the PLMN list generation or PLMN search by gathering the PLMN lists or the searches obtained from the RF transceivers.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
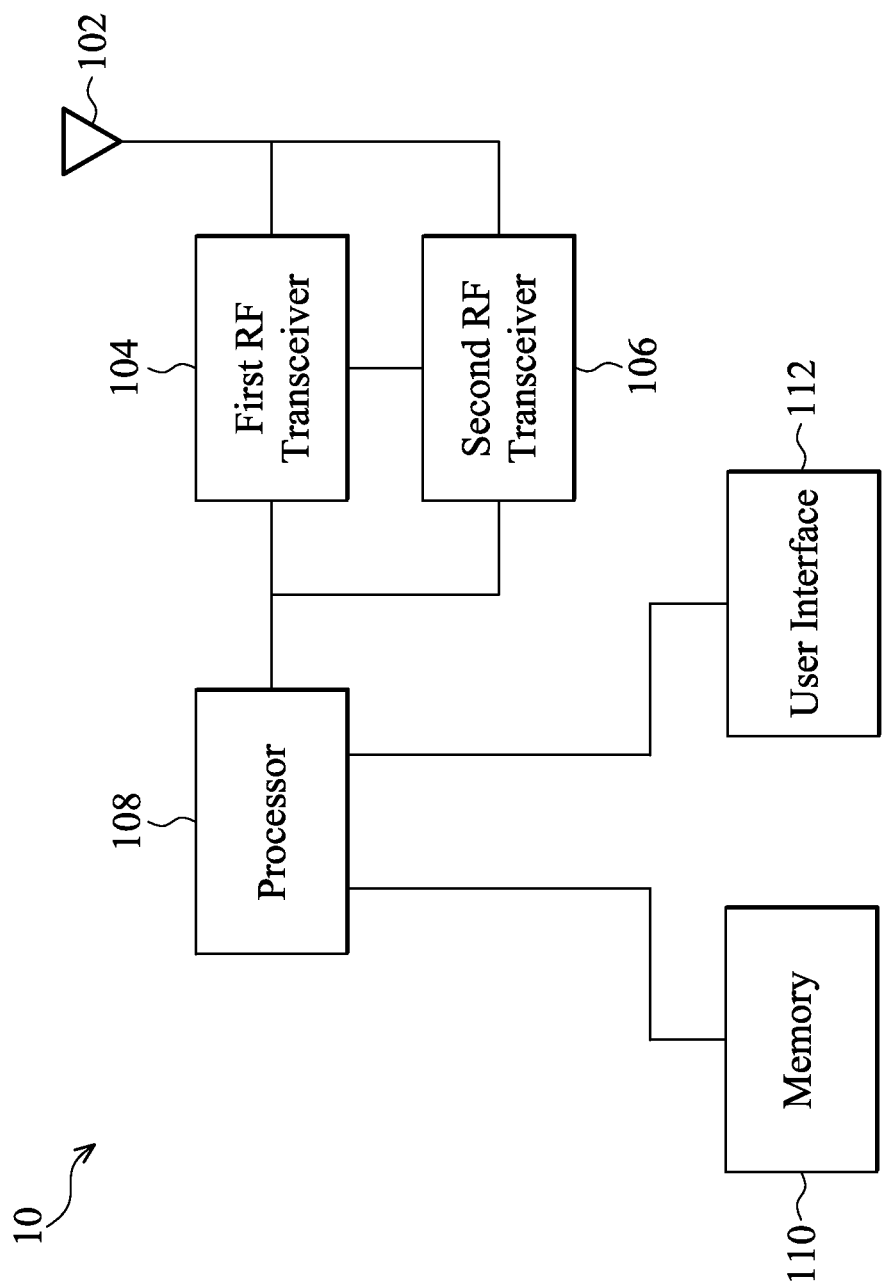
FIG. 1 is a block diagram illustrating user equipment according to one embodiment of the invention.

FIG. 1 is a block diagram illustrating user equipment 10 according to one embodiment of the invention. As shown in FIG. 1, the user equipment 10 comprises an antenna 102, a first RF transceiver 104, a second RF transceiver 106 and a processor 108. The user equipment 10 with dual RF transceivers 104 and 106 may be a mobile station according to one embodiment of the invention. The user equipment 10 in a mobile communication system is operating in a plurality of supported modes characterized by different radio access technology (RAT) types, e.g. global system for mobile communication (GSM) or universal mobile telecommunications system (UMTS) communication systems. Each supported mode includes a plurality of operating frequency bands. For example, the GSM communication system is a second generation (2G) RAT, and the operating frequency bands specified for the GSM communication system are 850, 900, 1800, or 1900 MHz. For another example, the UMTS communication system is a third generation (3G) RAT, and the operating frequency bands commonly used for the UMTS communication system range from Band-I to Band-IX.

Figure 2:
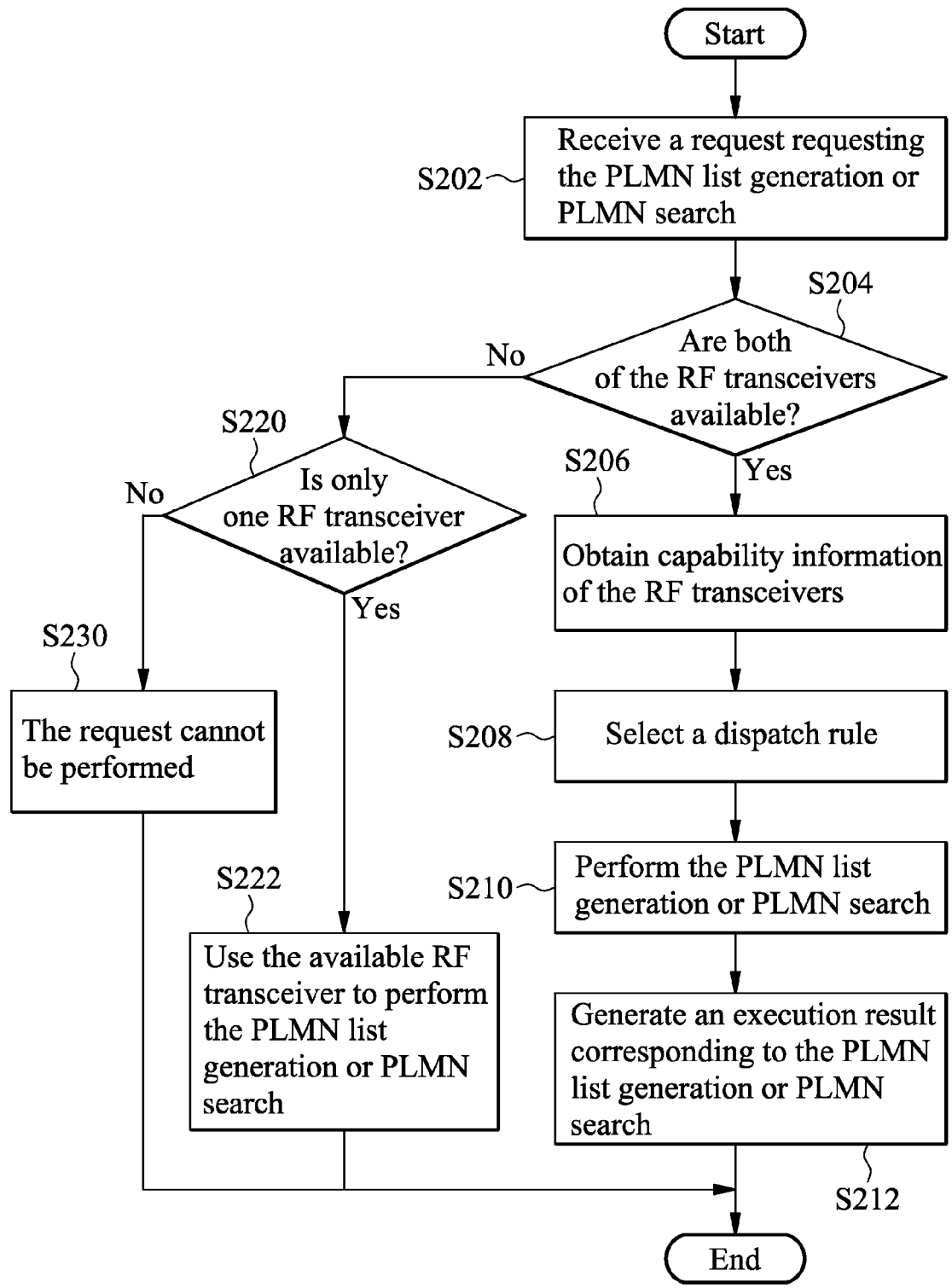
FIG. 2 is a flowchart illustrating a method for performing public land mobile network (PLMN) list generation and search on user equipment according to another embodiment of the invention.

FIG. 2 is a flowchart illustrating a method for performing public land mobile network (PLMN) list generation and search on a user equipment according to another embodiment of the invention. The operations of performing PLMN list generation or PLMN search are described below in details with reference to FIG. 1 and FIG. 2.

Referring to FIGS. 1 and 2, the first RF transceiver 104 and the second RF transceiver 106 are respectively coupled to the antenna 102 for operating in particular operating frequency bands via the antenna 102. The processor 108 coupled to the first RF transceiver 104 and the second RF transceiver 106 receives a request requesting the PLMN list generation or PLMN search (step S202 in FIG. 2). In one embodiment, the request may be activated either manually or automatically.

Then, the processor 108 determines whether both or either of the RF transceivers 104 and 106 is available for handling the PLMN list generation or PLMN search (step S204 in FIG. 2). Generally, each RF transceiver (the first RF transceiver 104 and the second RF transceiver 106) employs a dedicated channel or shared channel for voice call or data transfer. When an upper layer application sends commands to the first RF transceiver 104 for data transmission, the processor 108 determines whether a dedicated channel for the first RF transceiver 104 is available. If so, the available dedicated channel is dedicated to the first RF transceiver 104. That is, the first RF transceiver 104 is unavailable for the PLMN list generation or PLMN search. Similarly, when the processor 108 is notified of an incoming call, one of the RF transceiver 104 and 106 is responding as unavailable for the PLMN list generation or PLMN search due to the reception of the call.

When both of the RF transceivers 104 and 106 are available, the processor 108 obtains capability information of the RF transceivers 104 and 106 (step S206 in FIG. 2). The capability information may indicate the supported modes or the operating frequency bands for the RF transceivers 104 and 106, or it may indicate the operating network or operating frequency bands related to the UICC (Universal Integrated Circuit Card) coupled to the RF transceiver. According to one embodiment of the invention, the first RF transceiver 104 with an UICC operating in a GSM network may be designated for searching GSM PLMNs and the second RF transceiver 106 with an UICC operating in an UMTS network may be provided for searching UMTS PLMNs.

In addition, when only one RF transceiver is determined to be available (step S220 in FIG. 2), such as the first RF transceiver 104, the processor 108 directs the only one RF transceiver to perform the PLMN list generation or PLMN search (step S222 in FIG. 2). Otherwise, the request cannot be performed when none of the RF transceivers 104 and 106 is available (step S230 in FIG. 2).

Further, a dispatch rule applied for the RF transceivers 104 and 106 may be selected or determined according to the capability information, the supported modes and the operating frequency bands of the user equipment 10 (step S208 in FIG. 2). A detailed description of dispatch rule processing operations is provided in the following.

Next, according to the request and the dispatch rule, the RF transceivers 104 and 106 scan the supported modes and the operating frequency bands for generating respective PLMN lists, or perform a search for at least one selected operating frequency band (step S210 in FIG. 2). More specifically, when the accepted request concerns the PLMN list generation, the processor 108 instructs the RF transceivers 104 and 106 to generate the respective PLMN lists according to the dispatch rule. When the request is associated with the PLMN search, a search is then performed on the RF transceivers 104 and 106 for the at least one selected operating frequency band according to the dispatch rule.

As a result, the processor 108 provides an execution result corresponding to the PLMN list generation or PLMN search by gathering the respective PLMN lists or PLMN searches obtained from the RF transceivers 104 and 106 (step S212 in FIG. 2).

As shown in FIG. 1, the user equipment 10 further comprises a user interface 112 and a memory 110. The user interface 112, such as a display device, is coupled to the processor 108 for displaying the execution result corresponding to the PLMN lists or PLMN searches. According to one embodiment of the invention, the user interface 112 may also provide an option for a user to determine the selected operating frequency band for the PLMN search. For example, through the option in the user interface 112, the user may choose a GSM 900 band and GSM 1800 band for performing a PLMN search. The memory 110 coupled to the processor 108 stores the dispatch rule, the capability information and the execution result.

In one embodiment, the dispatch rule is determined on the basis of the supported modes. For example, it is assumed that the first RF transceiver 104 has GSM capability and the second RF transceiver 106 has WCDMA capability. Thus, the first RF transceiver 104 and the second RF transceiver 106 are configured to concurrently search the GSM carriers and WCDMA carriers, respectively. From the aforementioned description, an execution result is accordingly generated by combining the PLMN lists or PLMN searches from the RF transceivers 104 and 106.

Alternatively, the dispatch rule is determined by the plurality of operating frequency bands according to another embodiment of the invention. For example, it is assumed that both of the RF transceivers 104 and 106 are provided with GSM capability and WCDMA capability. Thus, when the first RF transceiver 104 is configured to search the GSM 900 band and WCDMA band I, the second RF transceiver 106 is configured to search all operating frequency bands other than the GSM 900 band and WCDMA band I.

Figure 3:
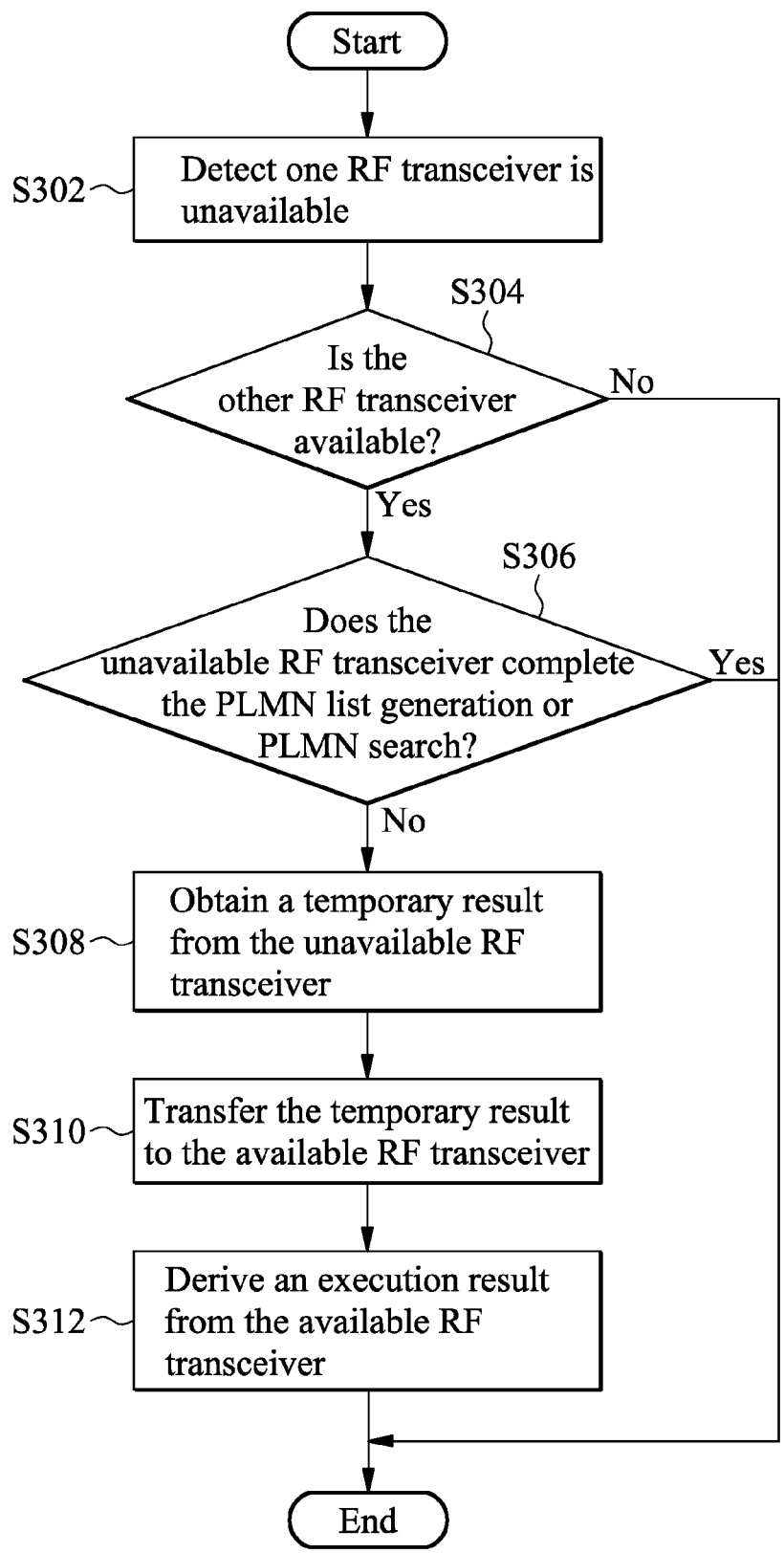
FIG. 3 is a flowchart illustrating job relay processing operations in accordance with the invention.

FIG. 3 is a flowchart illustrating job relay processing operations in accordance with the invention. First, one RF transceiver is detected to be unavailable and is performing PLMN list generation or PLMN search (step S302). According to the embodiment of FIG. 1, assuming that the first RF transceiver 104 is proceeding with the PLMN list generation or PLMN search, the processor 108 detects that a dial-up connection has been established via the dedicated channel of the first RF transceiver 104. When an elapsed time period in response to the first RF transceiver 104 from being unavailable to available exceeds an allowable waiting time period, the first RF transceiver 104 is determined to enter into a dedicated mode. Thus, the first RF transceiver 104 becomes unavailable.

Next, the processor 108 determines whether the other RF transceiver, such as the second RF transceiver 106, is available for handling the PLMN list generation or PLMN search originally belong to the first RF transceiver (step S304). Further, the processor determines whether the PLMN list generation or PLMN search executed by the first RF transceiver is uncompleted (step S306). As shown in FIG. 1, when the second RF transceiver 106 is available and the PLMN list generation or PLMN search executed by the first RF transceiver 104 is uncompleted, the processor 108 obtains a temporary result of the PLMN list generation or PLMN search from the first RF transceiver 104 (step S308). More specifically, the processor 108 attempts to detect uncompleted operating frequency bands which have not been searched by the first RF transceiver 104.

Further, the temporary result is transferred to the available RF transceiver to complete the PLMN list generation or PLMN search (step S310). In more detail, before transmitting the temporary result, the processor 108 may indicate whether the second RF transceiver 106 is capable of processing the uncompleted operating frequency bands according to the capability information. As a result, an execution result corresponding to the PLMN list generation or PLMN search is accordingly derived from the available RF transceiver (step S312).

Compared with the prior art, the search time period for the PLMN list generation can be substantially reduced by dual RF transceivers of the user equipment. Additionally, undesired failure or suspension may not occur since the job relay process is implemented during the search process. Also, operations of the dual RF transceivers can be adjusted dynamically to fit various requirements or a network environment, thereby enhancing generation and search performance of the user equipment.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for performing a public land mobile network (PLMN) list generation or PLMN search on user equipment having two radio frequency (RF) transceivers, wherein the user equipment is operating in a mobile communication system, the method comprising:
   receiving a request requesting the PLMN list generation or PLMN search;
   determining whether both or either of the RF transceivers is available for handling the PLMN list generation or PLMN search;
   selecting a dispatch rule;
   generating a PLMN list from both RF transceivers collaboratively or performing a search collaboratively for at least one selected operating frequency band on both RF transceivers in accordance with the request and the dispatch rule; and
   providing an execution result corresponding to the PLMN list generation or PLMN search by gathering results of the PLMN list or search obtained from the two RF transceivers.

2. The method as claimed in claim 1, wherein the determining step comprises:
   determining whether an RF transceiver requires a corresponding dedicated channel;
   determining whether the dedicated channel for the RF transceiver is available for handling the PLMN list generation or PLMN search;
   assigning the dedicated channel to the RF transceiver when the dedicated channel for the RF transceiver is available; and
   indicating the RF transceiver is available in response to the assigned dedicated channel.

3. The method as claimed in claim 1, further comprising:
   detecting that one RF transceiver is unavailable and is performing the PLMN list generation or PLMN search;
   determining whether the PLMN list generation or PLMN search executed by the RF transceiver is uncompleted;
   if the PLMN list generation or PLMN search executed by the RF transceiver is uncompleted, determining whether other RF transceiver is available for handling the PLMN list generation or PLMN search of the RF transceiver;
   if the other RF transceiver is available for handling the PLMN list generation or PLMN search originally belong to the RF transceiver, obtaining a temporary result of the PLMN list generation or PLMN search from the RF transceiver;
   relaying the temporary result of the PLMN list generation or PLMN search from the RF transceiver to the other RF transceiver for completing the PLMN list generation or PLMN search; and
   deriving the execution result corresponding to the PLMN list generation or PLMN search from the other RF transceiver.

4. The method as claimed in claim 3, wherein the detecting step comprises:
   determining whether an elapsed time period in response to the RF transceiver from being unavailable to available exceeds an allowable waiting time period.

5. The method as claimed in claim 3, wherein the step of obtaining the temporary result comprises:
   finding out uncompleted operating frequency bands from the RF transceiver.

6. The method as claimed in claim 5, further comprising:
   indicating whether the other RF transceiver is capable of processing the uncompleted operating frequency bands according to capability information before relaying the temporary result.

7. The method as claimed in claim 1, wherein generating a PLMN list from both RF transceivers collaboratively or performing a search collaboratively for at least one selected operating frequency band on both RF transceivers is further in accordance with a dispatch rule, and the dispatch rule is determined on the basis of supported modes operated by each RF transceiver.

8. The method as claimed in claim 1, wherein generating a PLMN list from both RF transceivers collaboratively or performing a search collaboratively for at least one selected operating frequency band on both RF transceivers is further in accordance with a dispatch rule, and the dispatch rule is determined by a plurality of operating frequency bands of the dual RF transceivers.

9. The method as claimed in claim 1, further comprising:
   determining the at least one selected operating frequency band to search for through an option provided in a user interface of the user equipment.

10. The method as claimed in claim 1, wherein the execution result corresponding to the PLMN list generation or PLMN search is displayed through a user interface of the user equipment.

11. The method as claimed in claim 7, wherein the user equipment is operating in a plurality of supported modes, each supported mode comprises a plurality of operating frequency bands, the method further comprising:
    obtaining capability information of the RF transceivers;
    selecting the dispatch rule according to the capability information, the supported modes and the operating frequency bands of the user equipment if both of the RF transceivers are available,
    wherein the capability information indicates the supported modes or the operating frequency bands for the RF transceivers.

12. The method as claimed in claim 11, wherein the supported modes correspond to radio access technologies (RAT) that are compliant with a global system for mobile communications (GSM) network or a universal mobile telecommunications system (UMTS) network.

13. User equipment for use in a mobile communication system, wherein the user equipment is operating in a plurality of supported modes and each supported mode comprises a plurality of operating frequency bands, comprising:
an antenna;
two RF transceivers coupled to the antenna for operating in the operating frequency bands via the antenna; and
a processor coupled to the RF transceivers for receiving a request requesting PLMN list generation or PLMN search, determining whether both or either of the RF transceivers are available for handling the PLMN list generation or PLMN search, selecting a dispatch rule, respectively directing the RF transceivers to generate a PLMN list or perform a search collaboratively for at least one selected operating frequency band in accordance with the request and the dispatch rule, and providing an execution result corresponding to the PLMN list generation or PLMN search by gathering results of the PLMN lists or search obtained from the RF transceivers.

14. The user equipment as claimed in claim 13, further comprising:
two dedicated channels dedicated to the RF transceivers, respectively,
wherein the processor determines whether a dedicated channel corresponding to an RF transceiver is available for handling the PLMN list generation or PLMN search when the RF transceiver requires for the corresponding dedicated channel, assigns the available dedicated channel to the RF transceiver and indicates the RF transceiver is available in response to the assigned dedicated channel.

15. The user equipment as claimed in claim 13, further comprising:
a user interface coupled to the processor for providing an option to determine the at least one selected operating frequency band for search and displaying the execution result corresponding to the PLMN list generation or PLMN search.

16. The user equipment as claimed in claim 13, further comprising:
a memory coupled to the processor for storing a the dispatch rule and the execution result, wherein the processor coupled to the RF transceivers for respectively directing the RF transceivers to generate a PLMN list or perform a search collaboratively for at least one selected operating frequency band further in accordance with the dispatch rule.

17. The user equipment as claimed in claim 13, wherein the processor further detects that one RF transceiver is unavailable and is performing the PLMN list generation or PLMN search, determines whether the PLMN list generation or PLMN search executed by the RF transceiver is uncompleted, determines whether the other RF transceiver is available for handling the PLMN list generation or PLMN search originally belong to the RF transceiver, obtains a temporary result of the PLMN list generation or PLMN search from the RF transceiver, relays the temporary result to the other RF transceiver for completing the PLMN list generation or PLMN search, and derives the execution result corresponding to the PLMN list generation or PLMN search from the other RF transceiver.

18. The user equipment as claimed in claim 17, wherein the processor further determines whether an elapsed time period in response to the RF transceiver from being unavailable to available exceeds an allowable waiting time period after detecting that the RF transceiver is unavailable.

19. The user equipment as claimed in claim 17, wherein the processor further identifies uncompleted operating frequency bands from the RF transceiver.

20. The user equipment as claimed in claim 19, wherein the processor further indicates whether the other RF transceiver is capable of processing the uncompleted operating frequency bands according to capability information before relaying the temporary result.

21. The user equipment as claimed in claim 16, wherein the dispatch rule is determined on the basis of the supported modes operated by each RF transceiver.

22. The user equipment as claimed in claim 16, wherein the dispatch rule is determined by a plurality of operating frequency bands of the dual RF transceivers.

23. The user equipment as claimed in claim 16, wherein the processor obtains capability information of the RF transceivers, and selects the dispatch rule according to the capability information, the supported modes and the operating frequency bands.

24. The user equipment as claimed in claim 23, wherein the supported modes correspond to radio access technologies (RAT) that are compliant with a global system for mobile communications (GSM) network or a universal mobile telecommunications system (UMTS) network.

* * * * *